(No Model.)

A. J. MOXHAM.
STREET RAILWAY FROG.

No. 358,619. Patented Mar. 1, 1887.

Witnesses
Francis P. Reilly
Arthur L. McGinley

Inventor
A. J. Moxham
by P. R. Voorhees
Atty.

(No Model.) 2 Sheets—Sheet 2.
A. J. MOXHAM.
STREET RAILWAY FROG.
No. 358,619. Patented Mar. 1, 1887.
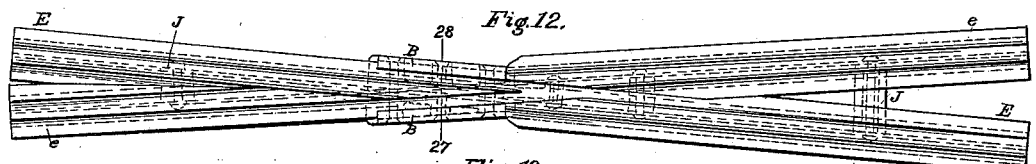
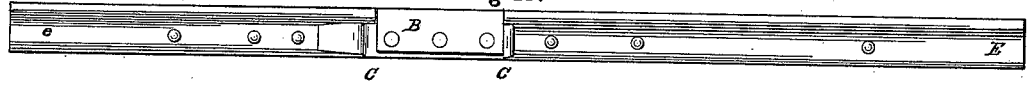
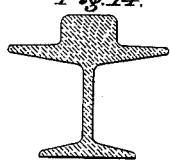
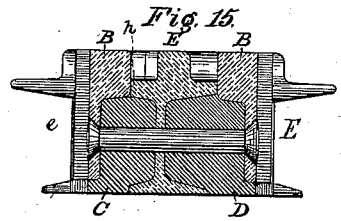
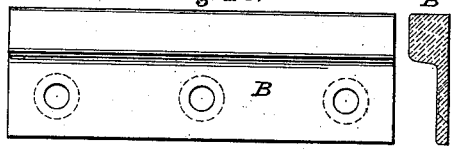
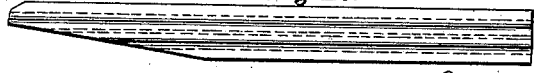
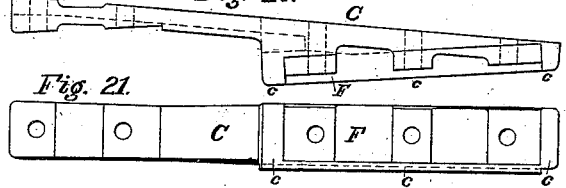
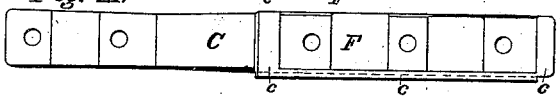
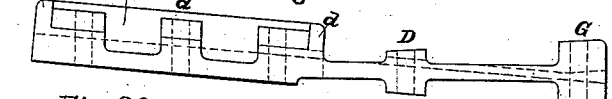
Witnesses
Francis R. Reilly
Arthur H. McGinley
Inventor
A. J. Moxham
By P. R. Voorhees
Atty.

UNITED STATES PATENT OFFICE.

ARTHUR J. MOXHAM, OF JOHNSTOWN, PENNSYLVANIA.

STREET-RAILWAY FROG.

SPECIFICATION forming part of Letters Patent No. 358,619, dated March 1, 1887.

Application filed November 15, 1886. Serial No. 218,983. (No model.)

*To all whom it may concern:*

Be it known that I, ARTHUR J. MOXHAM, of Johnstown, in the county of Cambria and State of Pennsylvania, have invented a new and useful Improvement in Street-Railway Frogs, which invention or improvement is fully set forth and illustrated in the following specification and accompanying drawings.

The object of this invention is to provide a girder-rail frog, of any suitable form of girder-rail, which can be constructed without the necessity of bending the rails composing it, and whose parts can be made with less necessary planing work, thereby lessening the cost of manufacture.

The invention consists of the parts and combinations of parts, as hereinafter described and claimed.

Figure 1:
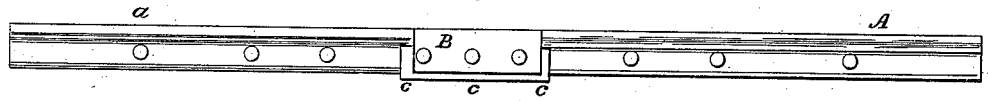
Figure 2:
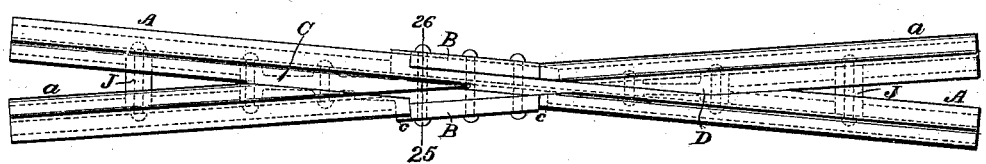
Figure 3:
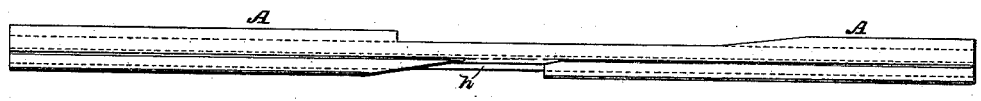
Figure 4:
Figure 5:
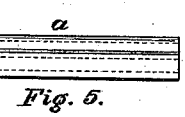
Figure 8:
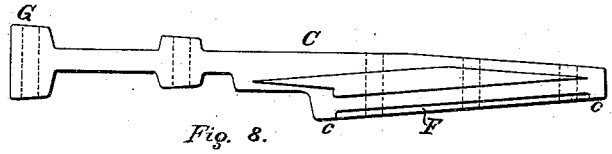
Figure 6:
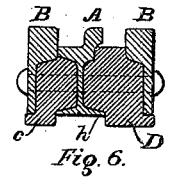
Figure 9:
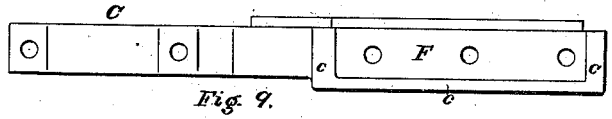
Figure 10:
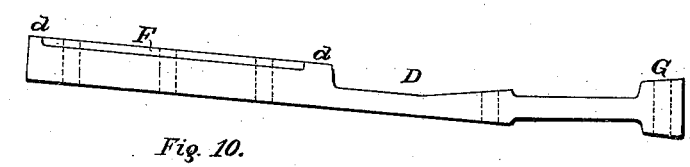
Figure 7:
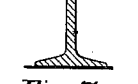
Figure 11:
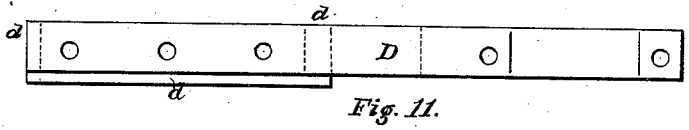

In the accompanying drawings, Figures 1 and 2 show, respectively, in side elevation and plan a side-bearing girder-rail frog constructed according to my invention. Fig. 3 shows in plan one rail unsevered, forming one part of the frog shown in the preceding figures. Figs. 4 and 5 show in plan the remaining rail portion of the frog, consisting of two pieces of rail cut to fit the rail shown in Fig. 3. Fig. 6 shows, enlarged, a vertical cross-section through the frog, taken at the line 25 26 of Fig. 2. Fig. 7 shows in cross-section the shape of side-bearing rail forming the built-up frog shown in plan in Fig. 2. Figs. 8 and 9 show, respectively, in plan and side elevation, enlarged, a cast-iron binding-chock for one side of the frog, as seen in plan in Fig. 2; and Figs. 10 and 11 show, enlarged, similar views of a cast-iron binding-chock for the opposite side of the frog, as seen in plan in Fig. 2. Figs. 12 and 13 show, respectively, in plan and side elevation, a center-bearing girder-rail frog constructed according to my invention. Fig. 14 shows in end elevation the shape of center-bearing rail forming the built-up frog shown in plan in Fig. 12. Fig. 15 shows, enlarged, a vertical cross-section through the frog, taken at the line 27 28 of Fig. 12. Fig. 16 shows in side and end elevation, enlarged, one of the guard-pieces forming part of frogs, as shown in side elevation both in Figs. 1 and 13. Fig. 17 shows in plan one rail unsevered, forming one part of the frog shown in Figs. 12 and 13. Figs. 18 and 19 show in plan the remaining rail portion of the frog, consisting of two pieces of rail cut to fit the rail shown in Fig. 17. Figs. 20 and 21 show, respectively, in plan and side elevation, enlarged, a cast-iron binding-chock for one side of the frog, as seen in plan in Fig. 12; and Figs. 22 and 23 show, enlarged, similar views of a cast-iron binding-chock for the opposite side of the frog, as seen in plan in Fig. 12.

In said figures the several parts are indicated by letters, as set forth in detailed description, as follows:

It has been customary heretofore in constructing railroad-frogs of girder-rails to so bend said rails that their heads performed both the purpose of heads and guards; but in the girder-frogs herein described this double office performed by the heads of the rails is abolished. This is accomplished and the cost of construction much reduced by fitting the rails to run through (without bending) in their respective directions, and providing a guard formed of a detached or separate piece (indicated by the letter B in several figures of the drawings, illustrating both the side-bearing and the center-bearing rail-frog.) Said guard is provided with a substantial upper portion, being that part subject to the wear of the car-wheels, and with a lighter lower portion below, which part serves only to properly secure the guard to the rest of the frog. A guard of uniform section, however, may be substituted, if desired.

The rail A, Sheet 1, Fig. 3, being in one piece, is termed the "through-rail." The other pieces of rail, *a a*, are fitted thereto. Said pieces, it will be observed, are only given a straight cut on a bevel, and only the removal of their exposed points is thereafter required, as Figs. 4 and 5 clearly show. All cutting of said pieces is easily effected by the saw—a much more economical tool than a planing-machine. The through-rail A alone needs to be cut and shaped in the planing-machine.

The same remarks apply to the through-rail E and the two pieces of rail *e e*, Sheet 2, Figs. 17, 18, and 19, in the use of saw and planer to fit them to the desired shape to form a frog of center-bearing rails. The planing operation is not only more costly but it is a much slower operation than that of sawing, as the mere mention will render obvious.

In frogs heretofore constructed of girder-rails every rail-piece required to be fitted by planer-work.

The letter $h$, Fig. 3, shows the uncut lower flange of the rail A exposed by cutting away the rail above it. The same letter in Fig. 17 shows one of the partly-cut-away side flanges of the center-bearing rail E.

The rails, being cut and fitted together as above described, are securely riveted or bolted together, as best seen in the plans, Figs. 2 and 12, through the interposed binding-chocks C and D, Figs. 8 and 9, for the side-bearing frog, and Figs. 22 and 23 for the center-bearing frog. The rivet-holes in said chocks are made true to each other and to holes in the webs of the rails and in the guard-pieces B, as clearly seen in the respective figures. Said chocks are provided with recesses F in their sides, into which the webs of the guard-pieces B are fitted. This construction permits of the frog presenting a flush or even surface to the contiguous pavement or road-bed. Said recess also makes a bottom bearing-flange or bed under each guard-piece B, which resists the downward thrust upon said guard and holds it likewise firm and solid against lateral strain upon the rivet or bolt heads. In the chocks C the supporting metal flanges or flush edges around the recesses F are indicated by the letters $c\ c$, and in the chocks D the supporting or flush edges or flanges are indicated by the letters $d\ d$. In addition to said binding-chocks spacing-chocks J are used, Figs. 2 and 12, so placed as to be non-obstructive to the splice-bar connections at each end of the frogs for securing them in track. Said chocks J may be of any well-known form, as a simple metal block with a hole through it, or a socket for a socket bolt or rivet. It is obvious, now, that by means of said chocks C, D, and J, guard-pieces B, and the necessary bolts or rivets the frogs will be properly and securely bound together into firm structures, ready to be laid in tracks whose main rails correspond in form to the form of the rails composing such frogs.

I do not confine myself to the use of girder-rails, either side-bearing or center-bearing, of the exact form shown, as it is evident that girder-rails of other forms may be similarly built up into frogs to suit the character of rails used in any particular track.

Having thus fully described my said improvement in frogs, as of my invention I claim—

1. A railroad-frog composed of girder-rails provided with separate guard-pieces riveted together and through said guard-pieces, substantially as and for the purposes set forth.

2. In a built-up girder-rail frog, the combination of binding-chocks and separate guard-pieces with the rails composing the frog, substantially as and for the purposes set forth.

3. In a built-up girder-rail frog, a binding-chock provided with lower projections or flanges, in combination with rail guard-pieces, whereby said guard-pieces are supported against vertical thrust or pressure, substantially as and for the purposes set forth.

4. In a built-up girder-rail frog, a binding-chock provided with end flanges or flush edges, in combination with rail guard-pieces, whereby the frog and guard-pieces are rendered flush with the contiguous road-bed or paving, substantially as and for the purposes set forth.

5. In a built-up girder-rail frog, a binding-chock provided with recesses, as F, in combination with rail guard-pieces, as B, substantially as and for the purposes set forth.

ARTHUR J. MOXHAM.

Witnesses:
N. E. HOOPES,
C. R. POWELL.